US012665229B2

(12) United States Patent
Lee

(10) Patent No.: US 12,665,229 B2
(45) Date of Patent: Jun. 23, 2026

(54) BATTERY TEST DEVICE INCLUDING STABILIZED BATTERY TEST

(71) Applicant: MRIG INC., Goyang-si (KR)

(72) Inventor: Jae Ho Lee, Goyang-si (KR)

(73) Assignee: MRIG INC., Goyang-si (KR)

( * ) Notice: Subject to any disclaimer, the term of this patent is extended or adjusted under 35 U.S.C. 154(b) by 757 days.

(21) Appl. No.: 18/108,642

(22) Filed: Feb. 12, 2023

(65) Prior Publication Data

US 2023/0268567 A1    Aug. 24, 2023

(30) Foreign Application Priority Data

Feb. 24, 2022    (KR) ........................ 10-2022-0024150

(51) Int. Cl.
H01M 10/42 (2006.01)
H01M 50/204 (2021.01)

(52) U.S. Cl.
CPC ..... H01M 10/4285 (2013.01); H01M 50/204 (2021.01); H01M 2220/20 (2013.01)

(58) Field of Classification Search
None
See application file for complete search history.

(56) References Cited

FOREIGN PATENT DOCUMENTS

| CN | 108682892 A | * | 10/2018 | ........ H01M 10/0404 |
|----|-------------|---|---------|----------------------|
| KR | 10-2011-0095548 A | | 8/2011 | |
| KR | 10-2019-0142513 A | | 12/2019 | |
| KR | 102106451 B1 | * | 5/2020 | ........ H01M 10/4285 |
| KR | 10-2021-0158241 A | | 12/2021 | |

* cited by examiner

*Primary Examiner* — Eric S. McCall
*Assistant Examiner* — Nigel H Plumb
(74) *Attorney, Agent, or Firm* — Park, Kim & Suh, LLC

(57) ABSTRACT

The present invention relates to a battery test device configured to perform various types of tests, such as a compression test, a drop test, a penetration test, a fire test, and a collision test, guarantee a stable battery test, and prevent the spread of a fire.

14 Claims, 10 Drawing Sheets

FIG. 1

Prior Art

FIG. 2

BATTERY TEST DEVICE INCLUDING STABILIZED BATTERY TEST

CROSS-REFERENCE TO RELATED APPLICATIONS

Pursuant to 35 U.S.C. § 119(a), this application claims the benefit of earlier filing dates and right of priority to Korean Application No. 10-2022-0024150, filed on Feb. 24, 2022, the contents of which are hereby incorporated by reference herein in their entirety.

BACKGROUND OF THE INVENTION

Field of the Invention

The present invention relates to a battery test device for physically testing a battery. More specifically, the present invention relates to a battery test device configured to perform various types of tests, such as a compression test, a drop test, a penetration test, a fire test, and a collision test, guarantee a stable battery test, and prevent the spread of a fire.

Background Art

In general, batteries are widely used in not only portable devices such as a smart phone and a laptop computer but also in large-sized devices such as an electric vehicle and an energy storage device.

Because battery store energy, there is a possibility that a fire or an explosion will occur due to external impact or the like and thus a safety evaluation test has been conducted on batteries due to such potential risks.

In particular, a compression test and a penetration test have been widely used to test how long a battery withstands external pressure or impact, and a battery test device (Korean Patent Registration No. 10-2106451) capable of performing both the compression test and the penetration test has been introduced.

A battery test device of the related art will be described in detail below with reference to the accompanying drawings.

FIG. 1 is a side view of a battery test device of the related art.

As shown in FIG. 1, the battery test device of the related art includes a lifting device 20 for lifting or lowering a lifting plate 22 on which a battery 10 is placed, a base frame 30 configured to place the lifting device 20 thereon, a pair of pressure blocks 40 provided at left and right sides of the battery 10, a pair of pressure cylinders 50 for pressurizing the pair of pressure blocks 40 against the battery 10, and a pressure pin 60 mounted inside a pressure cylinder 50 (the right pressure cylinder 50 in FIG. 1) of the pair of pressure cylinders 50 to be drawn from or inserted into the battery 10.

When the battery test device of the related art configured as described above is used, both the compression test and the penetration test can be conducted on the battery 10 but the lifting plate 22 on which the battery 10 is placed may be shaken by an external force, thus making it difficult to achieve an accurate test result. That is, when the battery 10 is pressurized by the pressure blocks 40, the lifting plate 22 may be shaken, thus resulting in a change of a position and angle of the battery 10, and an accurate compression test result cannot be achieved when the position and angle of the battery 10 change.

Two guide bars 32 are provided on each of upper and lower sides of the base frame 30 to guide directions of transfer of the pressure blocks 40. However, when four guide bars 32 are installed as described above, a total size of the battery test device increases and thus there is a limit in reducing the size of the battery test device. In addition, the overall center of gravity of the battery test device becomes high, thereby lowering stability.

A fire causing the burning of the battery 10 may occur during the test of the battery 10. The battery test device of the related art may be damaged when the heat of a fire occurring in the battery 10 is transmitted directly to the pressure cylinders 50.

Examples of a battery safety evaluation test include a drop test, a fire test, a collision test, etc., as well as the compression test and the penetration test. However, the battery test device of the related art does not have a function of dropping a battery to a specific point and thus cannot conduct the drop test, does not include a component for blocking the combustion heat of a battery and thus cannot conduct the fire test, and does not include a buffer control part at a side to which an impact force is applied and thus cannot conduct the collision test.

SUMMARY OF THE INVENTION

The present invention is directed to providing a battery test device configured to perform various types of safety evaluation tests, such as a compression test, a drop test, a penetration test, and a fire test, on a battery, and firmly fix a battery to stably perform a battery test.

The present invention is also directed to providing a battery test device configured to prevent the spread of a fire that may occur during the test of a battery and improve structural stability by lowering the overall center of gravity.

To achieve these objects, the present invention provides a battery test device comprising: a base block; a pair of guide bars each provided on one of left and right lower ends of both sides of the base block in a width direction to extend parallel to a longitudinal direction of the base block; a first transfer block and a second transfer block positioned on upper surfaces of the both sides of the base block in the longitudinal direction, wherein the pair of guide bars are mounted to pass through both sides of the first and second transfer blocks in the width direction to transfer the first and second transfer blocks to be close to or away from each other; a first pressure cylinder and a second pressure cylinder fixedly coupled to the both sides of the base block in the longitudinal direction, and configured to transfer the first transfer block and the second transfer block, respectively; a lifting block mounted on a surface of the first transfer block facing the second transfer block to be moved on or down, and having an upper surface on which a battery is placed; a lifting unit mounted on the first transfer block, and configured to moving the lifting block up and down; and a compression jig mounted on a surface of the second transfer block facing the first transfer block, and configured to pressurize the battery when the first and second transfer blocks are transferred to be close to each other.

And the battery test device may further comprise a first fixing bracket coupled to the first pressure cylinder and fixed on an upper surface of one side of the base block; and a second fixing bracket coupled to the second pressure cylinder and fixed to an upper surface of another side of the base block, wherein the first transfer block comprises a first vertical plate vertically erected between the first fixing bracket and the battery, and a pair of first side plates on both sides of the first vertical plate in the width direction, and the second transfer block comprises a second vertical plate vertically erected between the second fixing bracket and the battery, and a pair of second side plates on both sides of the second vertical plate in the width direction.

And the battery test device may further comprise a first fireproof chamber installed in the base block to accommodate the first fixing bracket and the first pressure cylinder, and filled with carbon dioxide, and a second fireproof chamber installed in the base block to accommodate the second fixing bracket and the second pressure cylinder, and filled with carbon dioxide.

And the battery test device may further comprise a first load cell on a portion of the first vertical plate to which pressure is applied by the first pressure cylinder, and a second load cell provided on a portion of the second vertical plate to which pressure is applied by the second pressing cylinder.

And the first and second pressure cylinders may be applied as hydraulic cylinders for buffering an impact force applied in a direction in which a piston is inserted to conduct a battery collision test.

And the battery test device may further comprise a jig transfer cylinder configured to transfer the compression jig in the width direction of the base block.

And the lifting unit may comprises a lifting cylinder including a lifting piston to be drawn in a vertical direction, and coupled a surface opposite to a surface of the first vertical plate in contact with the lifting block among both surfaces of the first vertical plate; and a lifting chain arranged to be hung on an idle roller on an upper end of the first vertical plate, and having both longitudinal ends coupled to the lifting piston and the lifting block.

And the lifting block may comprise a horizontal part on which the battery is placed, and a vertical part coupled to one end of the horizontal part while in contact with an outer side of the first vertical plate.

And the fixing unit may comprise a pair of clampers mounted on both sides of the first vertical plate in the width direction to hang both sides of a surface of the vertical part facing the battery in the width direction thereon; and a plurality of fixing cylinders configured to transfer the pair of clampers in a thickness direction of the first vertical plate so as to pressurize the vertical part against the first vertical plate or separate the vertical part from the first vertical plate.

And the battery test device may further comprise a turntable provided on a portion of the lifting block on which the battery is placed, and configured to be rotatable about a vertical central axis; and a rotating unit configured to rotate the turntable.

And the battery test device may further comprise a pair of fixing frames fixed on an upper side of the base block to be in parallel to the pair of guide bars in the longitudinal direction; a transfer frame arranged perpendicular to the pair of fixing frames and configured to be moved in the longitudinal direction of the pair of fixing frames; and a hoist mounted on the transfer frame to be transferred in a longitudinal direction of the transfer frame.

And the battery test device may further comprise a support, for a drop test, coupled to a point on an upper surface of the base block corresponding to a position of the hoist.

And the compression jig may be detachably coupled to the second transfer block, and the battery test device may further comprise a penetration jig mounted on a surface of the second transfer block facing the first transfer block and including a through pin configured to pass through the battery when the first and second transfer blocks are transferred to be close to each other.

And the battery test device may further comprise a heating device configured to heat the battery, which is placed on the lifting block, to an ignition temperature.

BRIEF DESCRIPTION OF THE DRAWINGS

FIG. 1 is a side view of a battery test device of the related art.

FIG. 2 is a perspective view of a battery test device according to an embodiment of the present invention.

DETAILED DESCRIPTION

Hereinafter, embodiments of the present invention will be described in detail with reference to the accompanying drawings. The present invention is, however, not limited thereto and may be embodied in many different forms. Rather, the embodiments set forth herein are provided so that this disclosure will be thorough and complete, and fully convey the scope of the invention to those of ordinary skill in the art. Throughout the specification, the same reference numbers represent the same elements.

Figure 2:
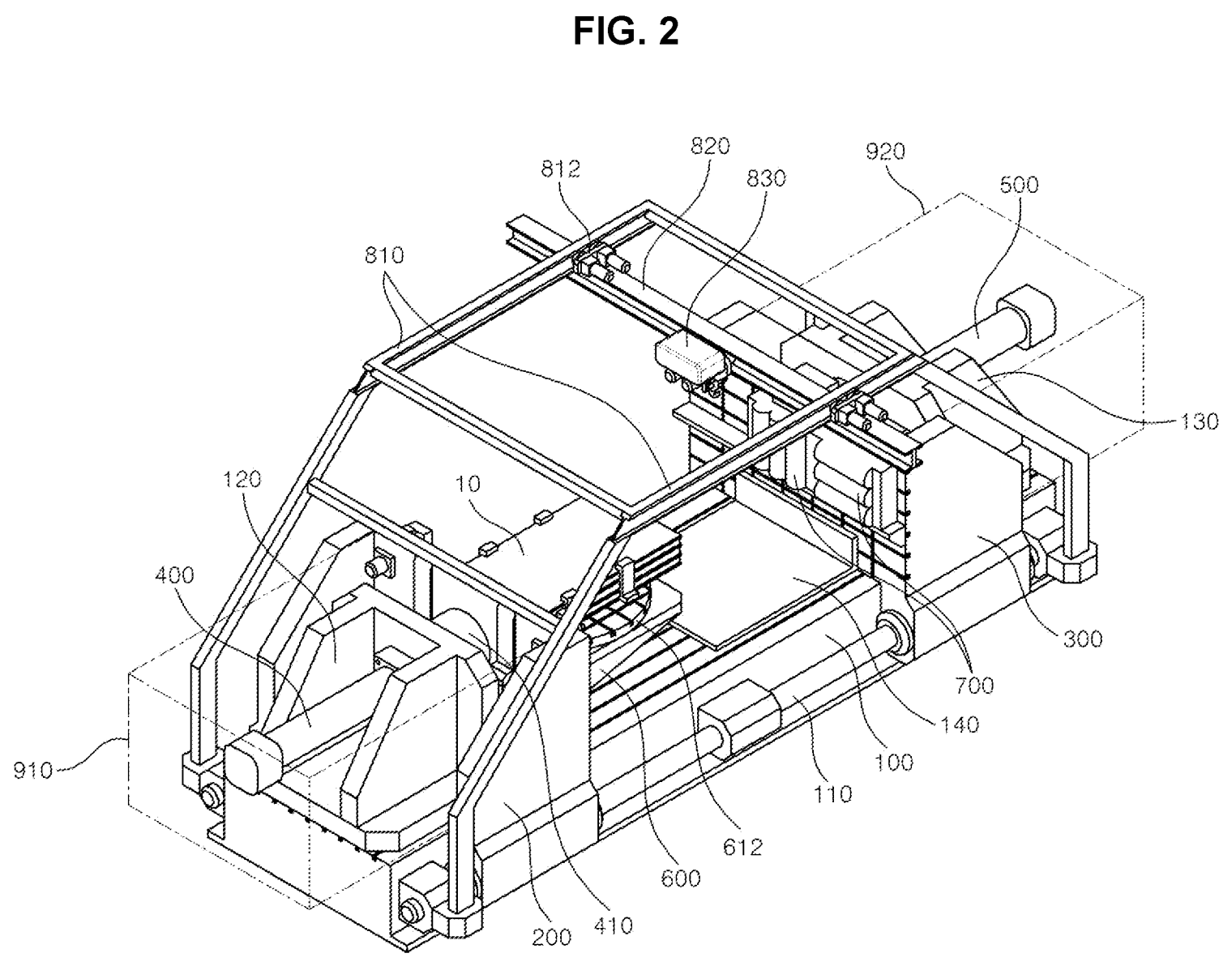
Figure 3:
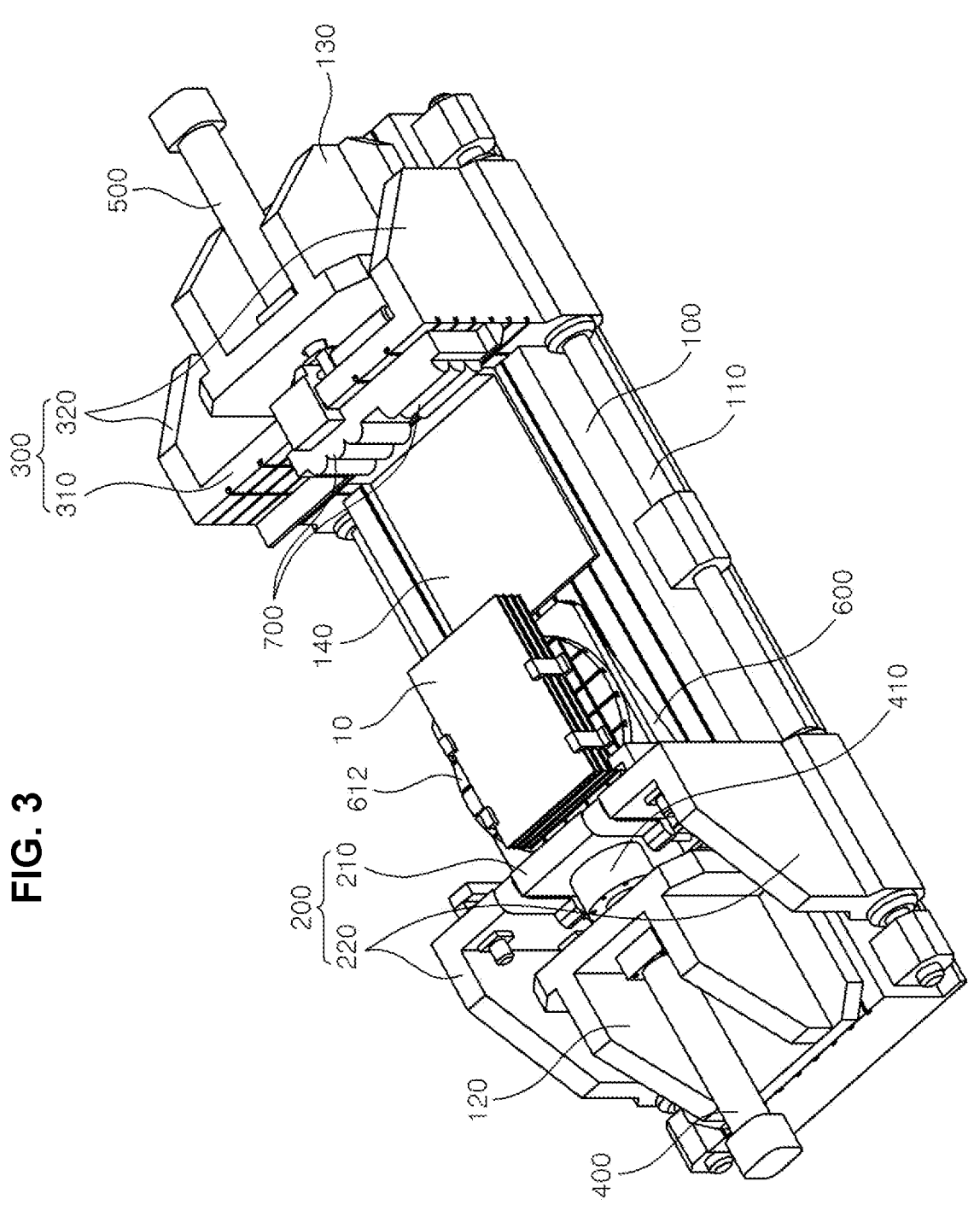
FIGS. 3 and 4 are perspective views of an internal configuration of the embodiment of FIG. 2.
Figure 4:
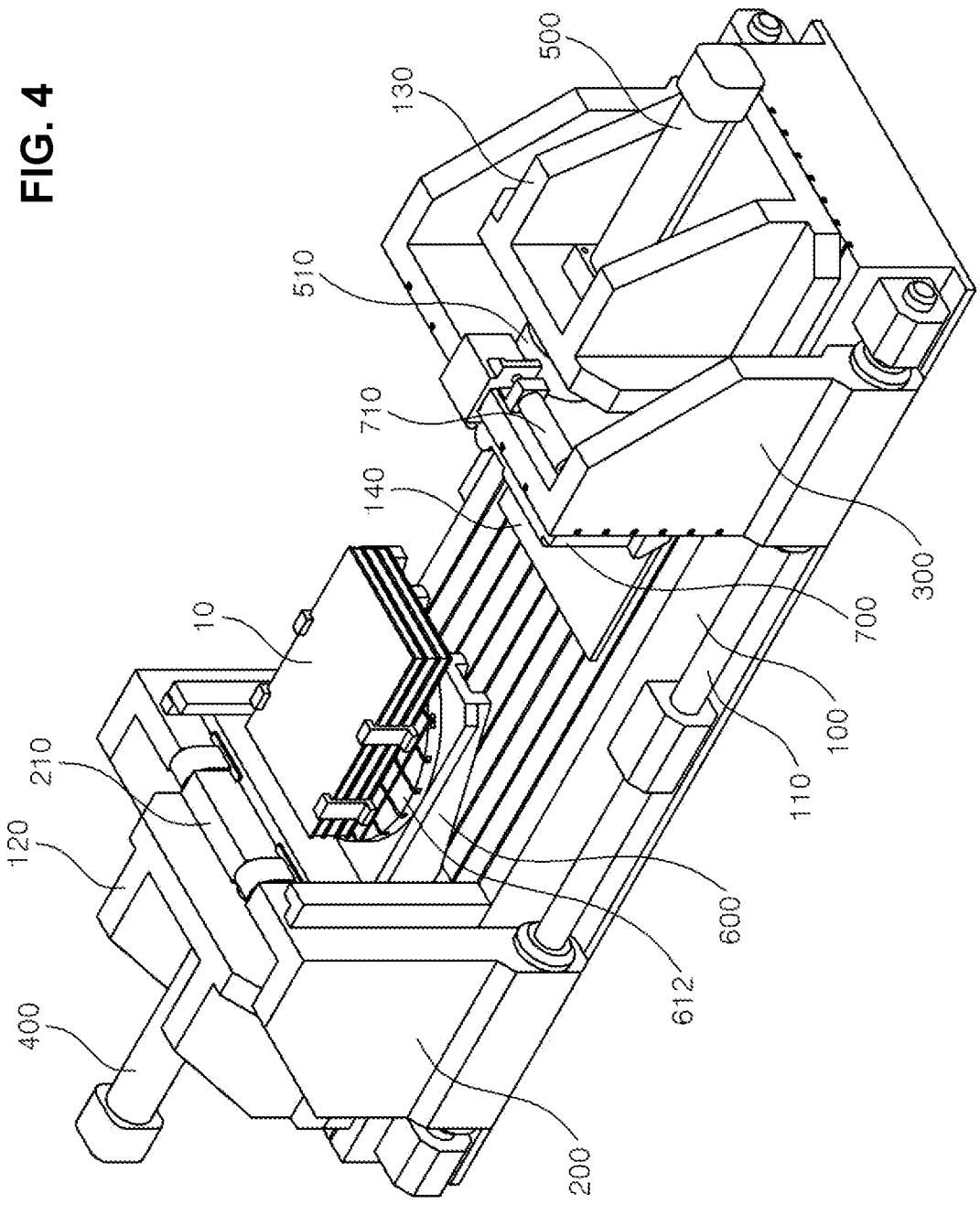

FIG. 2 is a perspective view of a battery test device according to an embodiment of the present invention. FIGS. 3 and 4 are perspective views of an internal configuration of the embodiment of FIG. 2.

The battery test device of the present invention is a type of a test device for evaluating the stability of a battery 10, and includes, as basic components, a base block 100, a pair of guide bars 110 provided at both sides of the base block 100 in a width direction to extend parallel to the base block 100 in a longitudinal direction, a first transfer block 200 and a second transfer block 300 configured to be transferred along the pair of guide bars 110, a first pressure cylinder 400 and a second pressure cylinder 500 for transferring the first transfer block 200 and the second transfer block 300, a lifting block 600 mounted on a side of the first transfer block 200 facing the second transfer block 300 to be moved up or down and having a top surface on which the battery 10 is placed, a lifting unit 620 mounted on the first transfer block 200 to move the lifting block 600 up or down, and a compression jig 700 mounted on a side of the second transfer block 300 facing the first transfer block 200, and configured to pressurize the battery 10 when the first transfer block 200 and the second transfer block 300 are transferred to be close to each other.

The first and second transfer blocks 200 and 300 are positioned on upper surfaces of both sides of the base block 100 in the longitudinal direction, and the pair of guide bars 110 are mounted to pass through both sides of the first and second transfer blocks 200 and 300 in a width direction, so that the first and second transfer blocks 200 and 300 may slide along the pairs of guide bars 110 in the longitudinal direction. In this case, the first and second transfer blocks 200 and 300 may be transferred independently from each other, and thus, the battery 10 is compressed by the compression jig 700 to perform the compression test on the battery 10 when the first and second transfer blocks 200 and 300 are transferred to be close to each other.

In this case, in the battery test device of the present invention, the lifting block 600 is configured to be moved in the vertical direction to adjust the height thereof according to the specification of the battery 10 to be tested. Because the lifting block 600 is configured to be moved up and down while being coupled to the first transfer block 200, a height of a structure for moving the battery 10 up and down can be reduced, thus contributing to the miniaturization of the battery test device. The structure of the lifting unit 620 for moving the lifting block 600 up and down will be described in detail with reference to FIGS. 5 to 7 below.

Figure 1:
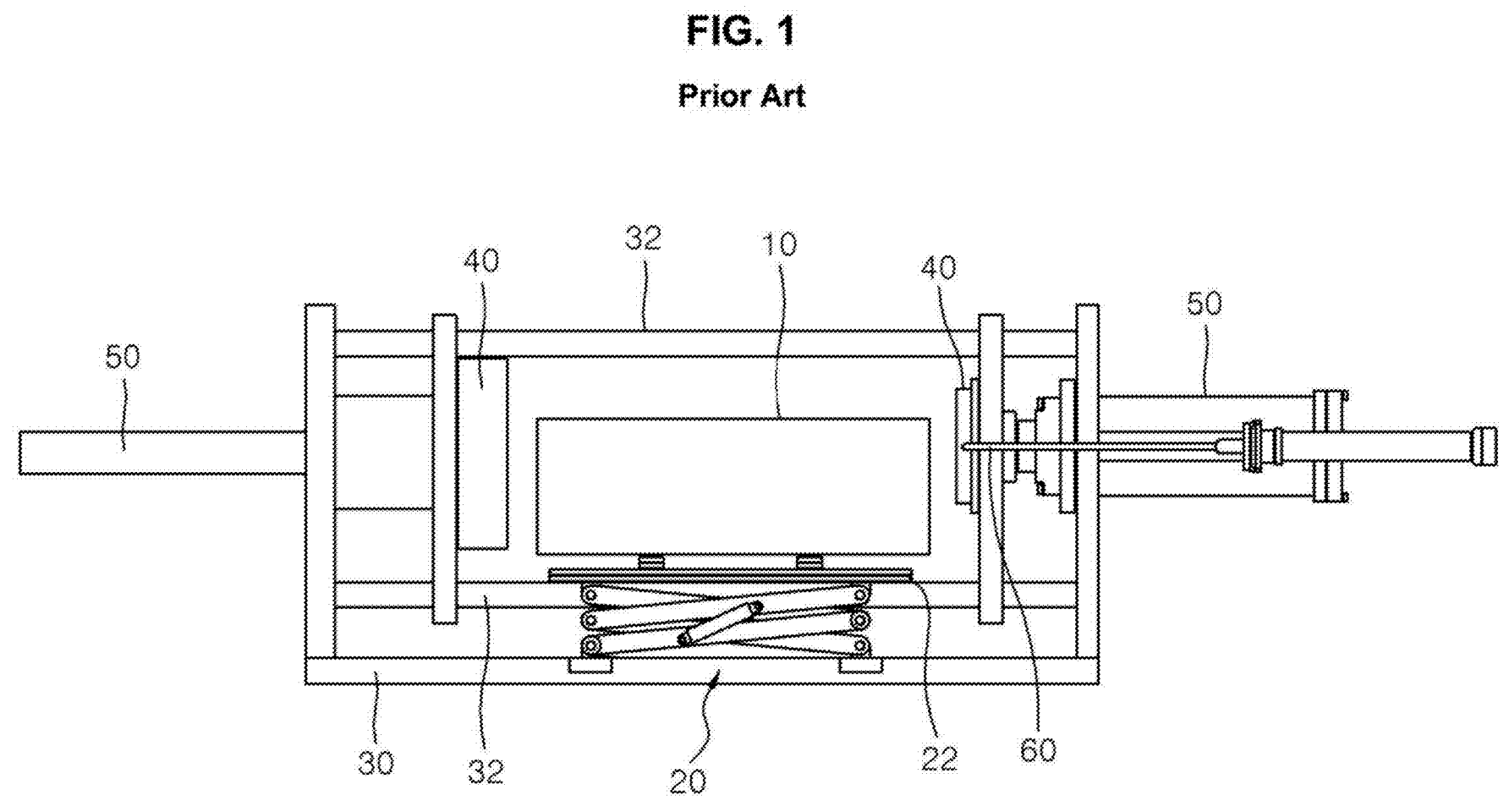

Because the battery test device of the related art shown in FIG. 1 includes a total of four guide bars 32 for guiding a direction of pressurization, structures around the battery 10 are complicated and the overall center of gravity of the battery test device is high, thus reducing stability. In contrast, in the battery test device of the present invention, only one guide bar 110 is provided at each of the left and right sides of the base block 100 to guide the direction of pressurization and thus structures around the battery 10 may be simple and the overall center of gravity of the battery test device is low, thus improving stability.

Meanwhile, a first fixing bracket 120 and a second fixing bracket 130 are fixed to both sides of the base block 100 in the longitudinal direction to more stably fix the first and second pressure cylinders 400 and 500 on the base block 100. The first pressure cylinder 400 is coupled to the first fixing bracket 120, and the second pressure cylinder 500 is coupled to the second fixing bracket 130. When the first and second fixing brackets 120 and 130 are provided to fix the first and second pressure cylinders 400 and 500 as described above, the first and second pressure cylinders 400 and 500 do not shake or the position thereof do not change even when the first and second pressure cylinders 400 and 500 apply a very large force to pressurize the first and second transfer blocks 200 and 300 to conduct the compression test on the battery 10.

The first transfer block 200 includes: a first vertical plate 210 vertically erected between the first fixing bracket 120 and the battery 10 to mount the lifting block 600 thereon, and a pair of first side plates 220 provided on both sides of the first vertical plate 210 in the width direction. Similarly, the second transfer block 300 includes: a second vertical plate 310 vertically erected between the second fixing bracket 130 and the battery 10 to mount the compression jig 700 thereon, and a pair of second side plates 320 provided on both sides of the second vertical plate 310 in the width direction. As described above, when the first and second transfer blocks 200 and 300 are manufactured to have a '⊏'-shaped planar shape, the first and second transfer blocks 200 and 300 are less likely to warp or be deformed even when an external force is applied in any of all directions, thus improving durability.

Meanwhile, the battery 10 is likely to be burned during the test of the battery 10, and the first and second pressure cylinders 400 and 500 may be damaged by flames when the heat of combustion of the battery 10 is delivered thereto. To solve the above-described problem, the battery test device of the present invention may include a first fireproof chamber 910 that is installed in the base block 100 to accommodate the first fixing bracket 120 and the first pressure cylinder 400 and is filled with carbon dioxide, and a second fireproof chamber 920 that is installed in the base block 100 to accommodate the second fixing bracket 130 and the second pressure cylinder 500 and is filled with carbon dioxide. In this case, the first and second fireproof chambers 910 and 920 that are filled with carbon dioxide to prevent the spread of a fire are those generally used in the field of firefighting and thus a detailed description thereof is omitted here.

When the first and second fireproof chambers 910 and 920 are provided as described above, the battery test device may be prevented from being damaged by a fire and thus the battery 10 may be freely tested under various conditions. Particularly, a fire test conducted to test a temperature at which the battery 10 is burned may be carried out freely without fear of damage to the battery test device.

Meanwhile, the battery test device of the present invention may include a first load cell 410 installed on a portion of the first vertical plate 210 to which pressure is applied by the first pressure cylinder 400 and a second load cell 510 installed on a portion of the second vertical plate 310 to which pressure is applied by the second pressure cylinder 500 to accurately measure a force applied to pressurize the battery 10. When the first and second load cells 410 and 510 are provided as described above, the magnitude of the pressure applied to the battery 10 may be accurately measured in real time.

Meanwhile, the battery test device of the related art includes a load cell on only a part thereof for applying a compressive force to a battery and does not include a configuration for buffering an impact force applied from the outside, and thus cannot be used to perform a battery collision test. As described above, in the battery test device of the present invention, the first and second load cells 410 and 510 are provided on both sides of the battery 10, and the first and second pressure cylinders 400 and 500 are applied as hydraulic cylinders for buffering an impact force applied in a direction in which a piston is inserted. Thus, the configuration of the battery test device is also characterized in a battery collision test can be performed by the battery test device. In this case, hydraulic cylinders for absorbing an impact force are already widely commercialized in various industrial fields and thus a detailed descriptions of a configuration and operating principles thereof will be omitted here.

Generally, portions of the compression jig 700 that pressurize the battery 10 are formed to have a convex shape but the convex portions may need be arranged to be long in a vertical or horizontal direction according to a test condition. In this case, when a compression jig whose convex portions are arranged in the vertical direction and a compression jig whose convex portions are arranged in the horizontal direction are manufactured separately, it is necessary to repeatedly replace between the compression jigs according to a test condition and thus it will take a lot of time to test the battery 10.

Therefore, the compression jig 700 included in the battery test device of the present invention may be formed to include both convex portions arranged in the vertical direction and convex portions arranged in the horizontal direction. When two or more portions of the compression jig 700 that pressurize the battery 10 have different shapes as described above, the compression jig 700 is mounted on the second transfer block 300 to be transferred in the width direction of the base block 100 to adjust a portion of the compression jig 700 in contact with the battery 10, and a jig transfer cylinder 710 may be additionally provided to transfer the compression jig 700 in the width direction of the base block 100. When the jig transfer cylinder 710 is additionally provided, a condition for the compression test to be conducted on the battery 10 may be easily changed by adjusting the position of the compression jig 700, thereby significantly reducing a time required for the compression test of the battery 10.

Figure 5:
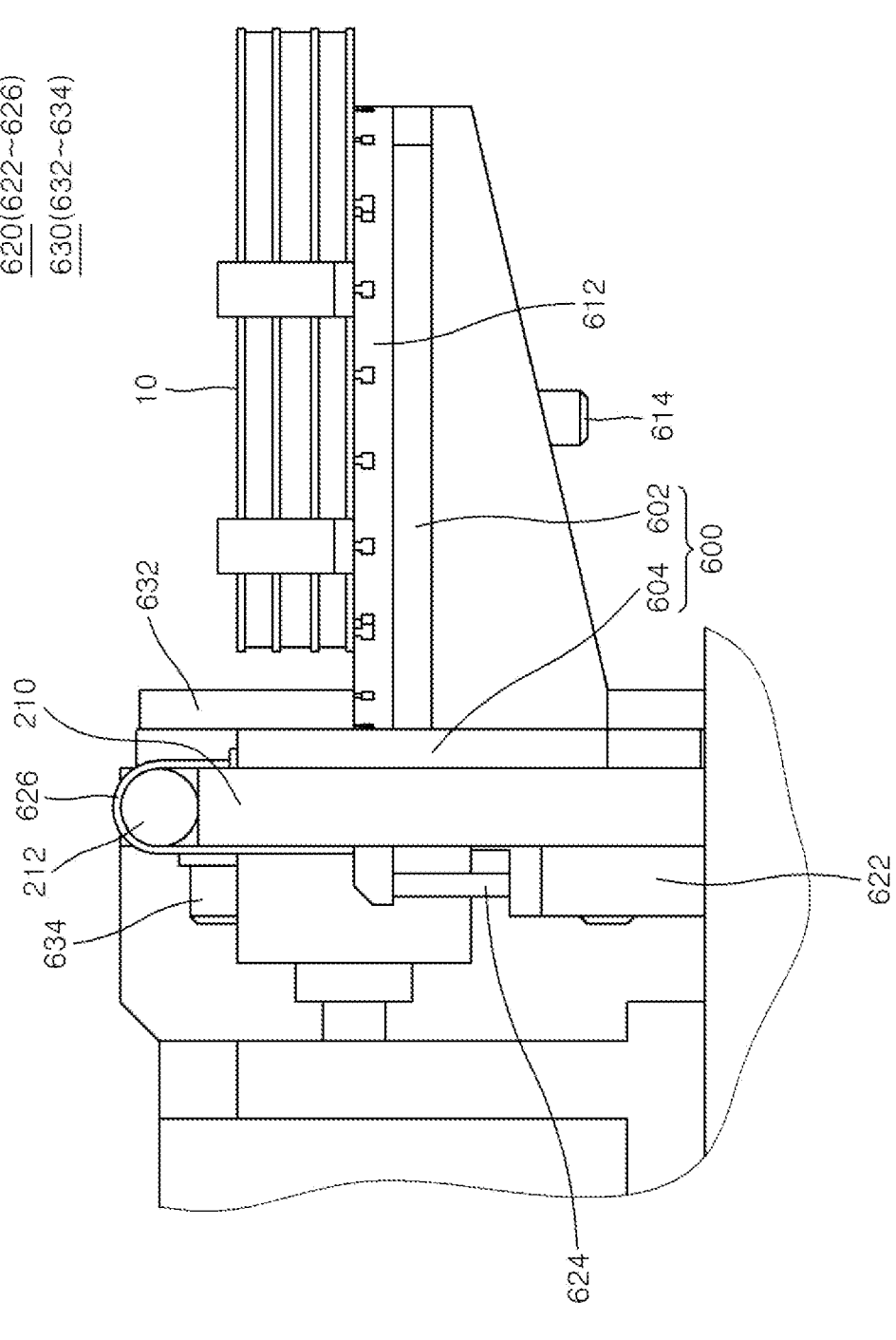
FIGS. 5 to 7 are a side view and perspective views of a structures in which a lifting unit and a fixing unit included in the embodiment of FIG. 2 are mounted.
Figure 6:
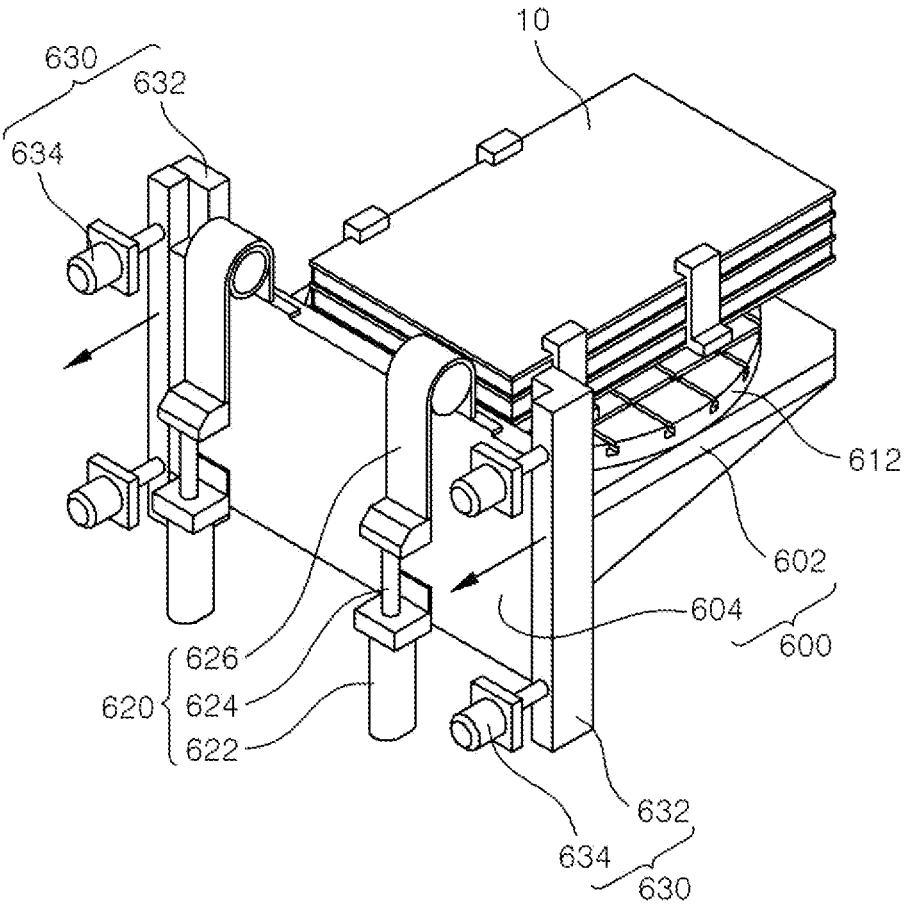
Figure 7:
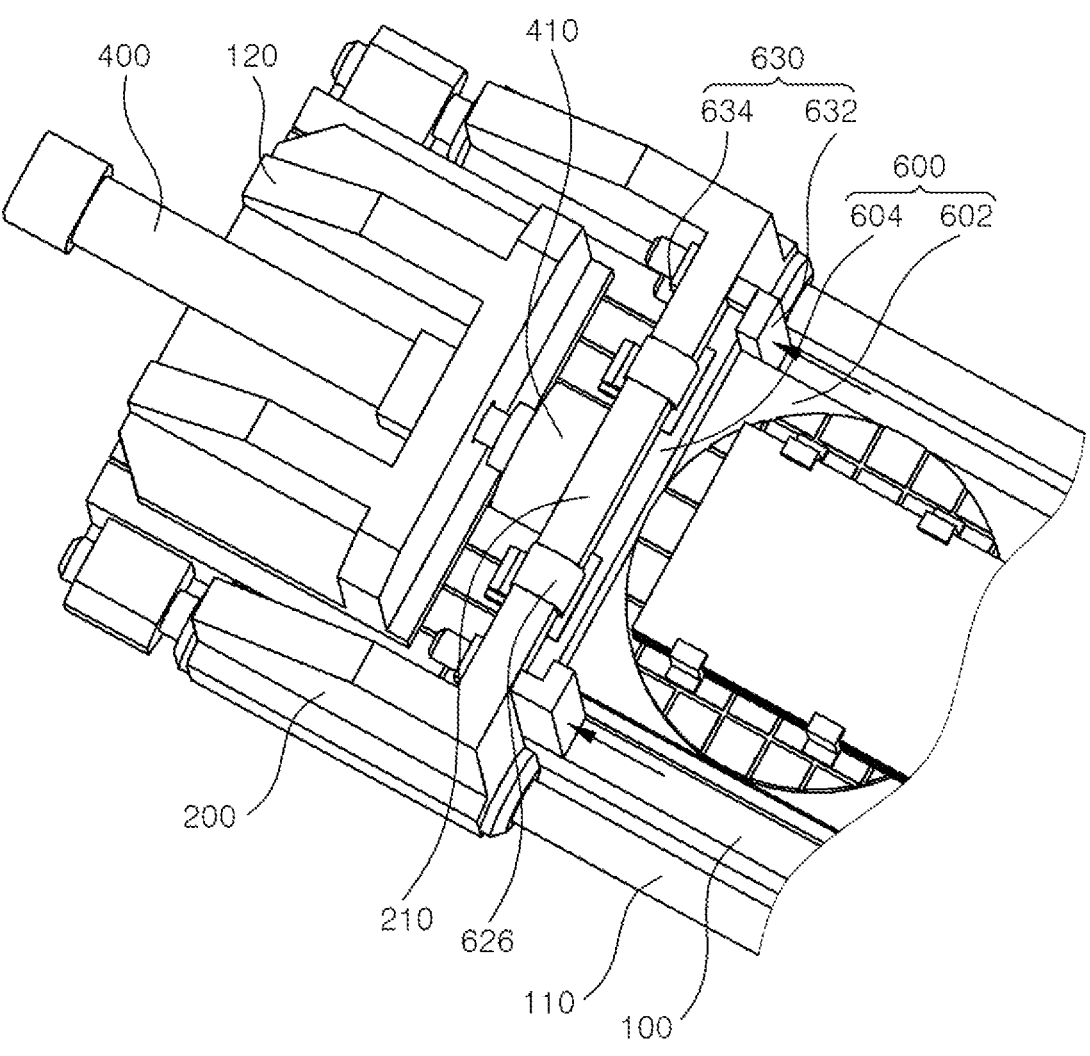

FIGS. 5 to 7 are a side view and perspective views of a structures in which a lifting unit and a fixing unit included in the embodiment of FIG. 2.

The battery test device of the present invention is further characterized in that the lifting block 600 on which the battery 10 is placed is configured to be moved up and down while being coupled to the first transfer block 200. In general, the battery 10 applied to an electric vehicle or various types of electric storage devices is very heavy and thus a large amount of power is required to lift or lower the lifting block 600 on which the battery 10 is placed.

Thus, in order to lift or lower the lifting block 600 on which the battery 10 is placed with a smaller amount of power, the lifting unit 620 of the present invention may include a lifting cylinder 622, which includes a lifting piston 624 to be drawn in the vertical direction and is coupled to a surface opposite to a surface of the vertical plate 210 in contact with the lifting block 600 among both surfaces of the first vertical plate 210, and a lifting chain 626 arranged to be hung on an idle roller 212 on an upper end of the first vertical plate 210 and having both longitudinal ends coupled to the lifting piston 624 and the lifting block 600.

The lifting block 600 is lifted up when the lifting piston 624 is moved down to move the lifting chain 626 closer to the lifting cylinder 622, and is lowered by the self-weight thereof when the lifting piston 624 is moved up to move the lifting chain 626 away from the lifting cylinder 622. A structure in which the lifting chain 626 mounted such that a middle part thereof is hung on the idle roller 212 transmits a force of the lifting cylinder 622 to the lifting block 600 is substantially the same as a structure of lifting an object using a pulley and thus the lifting block 600 on which the battery 10 is placed may be lifted with a smaller force.

In this case, when an upper end of the first vertical plate 210 is processed into a smooth curved surface, the lifting chain 626 may transmit a force of the lifting cylinder 622 to the lifting block 600 without the idle roller 212, but when the lifting chain 626 comes into direct contact with the first vertical plate 210, a large frictional force may be generated, thus resulting in a great loss of a force for lifting the lifting block 600. Therefore, the idle roller 212 is preferably provided on a portion of the first vertical plate 210 on which the lifting chain 626 is hung as shown in the present embodiment.

In addition, the lifting block 600 is configured such that a portion thereof on which the battery 10 is placed and a portion thereof in close contact with the first vertical plate 210 form a right angle. That is, the lifting block 600 includes a horizontal part 602 on which the battery 10 is placed, and a vertical part 604 coupled to one end of the horizontal part 602 while in contact with an outer side of the first vertical plate 210.

When the lifting block 600 includes the horizontal part 602 and the vertical part 604 as described above, the fixing unit 630 may be provided to pressurize the vertical part 604 against the first vertical plate 210 so that the lifting block 600 whose height is adjusted may be firmly fixed on the first vertical plate 210.

The fixing unit 630 may include: a pair of clampers 632 mounted on both sides of the first vertical plate 210 in the width direction to hang both sides of a surface of the vertical part 604, which faces the battery 10, in the width direction on the pair of clampers 632, and a plurality of fixing cylinders 634 for transferring the pair of clampers 632 in a thickness direction of the first vertical plate 210 to pressurize the vertical part 604 against the first horizontal part 210 or separate the vertical part 604 from the first horizontal part 210.

When the fixing unit 630 is configured as described above, the vertical part 604 is pressurized against the first vertical plate 210 by the pair of clampers 632 and thus the vertical part 604 and the first vertical plate 210 are integrally fixed together, when the pair of clampers 632 are pulled by the plurality of fixing cylinders 634 in a direction toward the first vertical plate 210 (a direction indicated by an arrow in FIGS. 6 and 7).

When the vertical part 604 is fixed on the first vertical plate 210 as described above, the lifting block 600 is prevented from being shaken or twisted even when a force is applied to the battery 10 and thus the compression test can be accurately performed on the battery 10.

Figure 8:
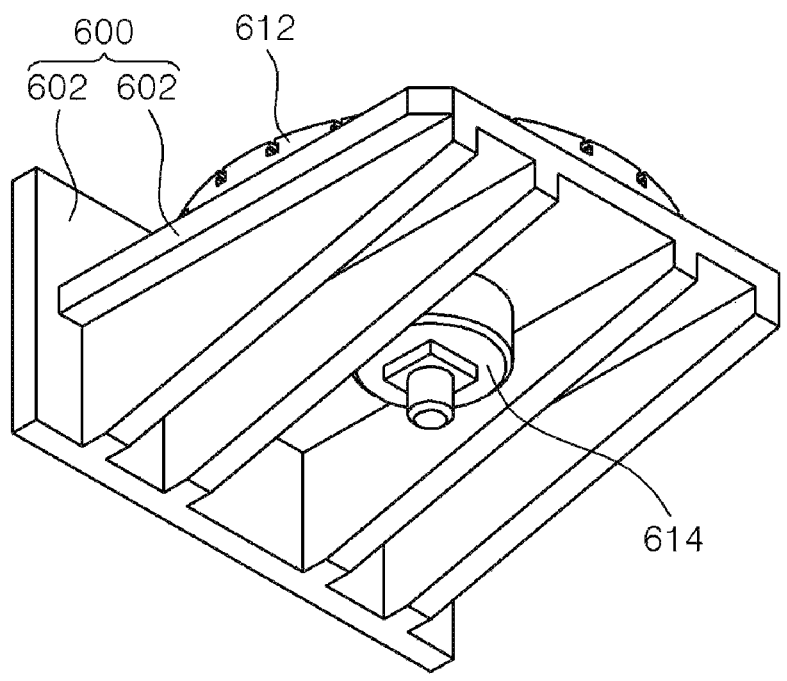
FIG. 8 is a bottom perspective view of a lifting block included in the embodiment of FIG. 2.

FIG. 8 is a bottom perspective view of the lifting block 600 included in the embodiment of FIG. 2.

The lifting block 600 according to the present invention is configured not only to be moved up and down but also adjust an angle of arrangement of the battery 10 placed thereon. That is, a turntable 612 rotatable about a vertical central axis may be provided on the portion of the lifting block 600, i.e., an upper surface of the horizontal part 602, on which the battery 10 is placed, and a rotating unit 614 may be further provided on a bottom surface of the horizontal part 602 to rotate the turntable 612. Here, the battery 10 is seated on an upper surface of the turntable 612.

The rotating unit 614 may be configured to include a motor for bi-directionally rotating the turntable 612 about the vertical central axis or configured as a rack-and-pinion structure for translating a reciprocating transfer force into a rotary motion. That is, any type of driving device may be applied as the rotating unit 614 as long as the turntable 612 can be rotated.

When the turntable 612 on which the battery 10 is placed is configured as a rotatable structure, a direction in which the battery 10 is placed can be corrected immediately and accurately when the direction is wrong, and a test can be continuously conducted on the battery 10 in all directions, thereby greatly improving the usability of the battery test device of the present invention.

Figure 9:
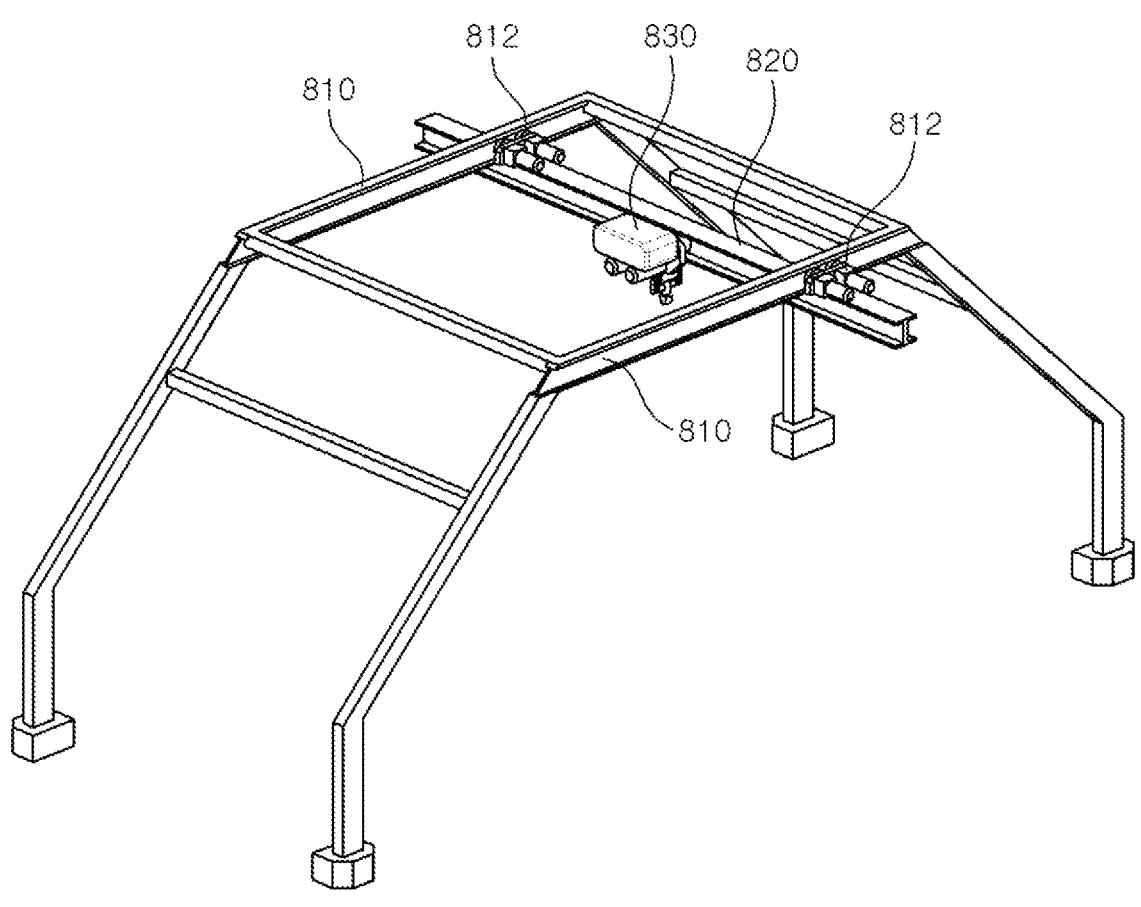
FIG. 9 illustrates a perspective view of a frame and a hoist included in the embodiment of FIG. 2.

FIG. 9 illustrates a perspective view of the frame and the hoist 830 included in the embodiment of FIG. 2.

To move the battery 100, which is heavy, by lifting the battery 10 with a mechanical force, the battery test device of the present invention may include a pair of fixing frames 810 fixed on an upper side of the base block 100 to be in parallel to the guide bars 110, a transfer frame 820 arranged perpendicular to the pair of fixing frames 810 and movable in a longitudinal direction of the pair of fixing frames 810, and a hoist 830 mounted on the transfer frame 820 to be transferred in a longitudinal direction of the transfer frame 820.

In this case, the transfer frame 820 is configured to be coupled to a transfer cart 812 mounted on the pair of fixing frames 810 and thus be capable of being moved smoothly without being rubbed against the fixing frames 810. In addition, the hoist 830 includes a roller that rolls in the longitudinal direction of the transfer frame 820 and thus be capable of being moved smoothly without being rubbed against the transfer frame 820.

When the fixed frames 810, the transfer frame 820, and the hoist 830 are provided, the battery 10 may be lifted by the hoist 830 to be accurately mounted on the lifting block 600. The hoist 830 is applied to existing transportation equipment and the like in various ways and thus a detailed description of the configuration and operation of the hoist 830 is omitted here.

As shown in the present embodiment, when the fixed frames 810, the transfer frame 820, and the hoist 830 are provided, a support for the drop test may be mounted at a point on an upper surface of the base block 100 corresponding to the position of the hoist 830 so that a drop test for dropping the battery 10 may be conducted. In this case, the drop test support should be formed of a material with very high impact strength not to be damaged or deformed even when the battery 10, which is heavy, falls and collides against the drop test support. As described above, when the support for the drop test is provided on the upper surface of the base block 100, the user can lift the battery 10 with the hoist 830 and drop the battery 10 to the support for the drop test to perform the drop test on the battery 10.

Figure 10:
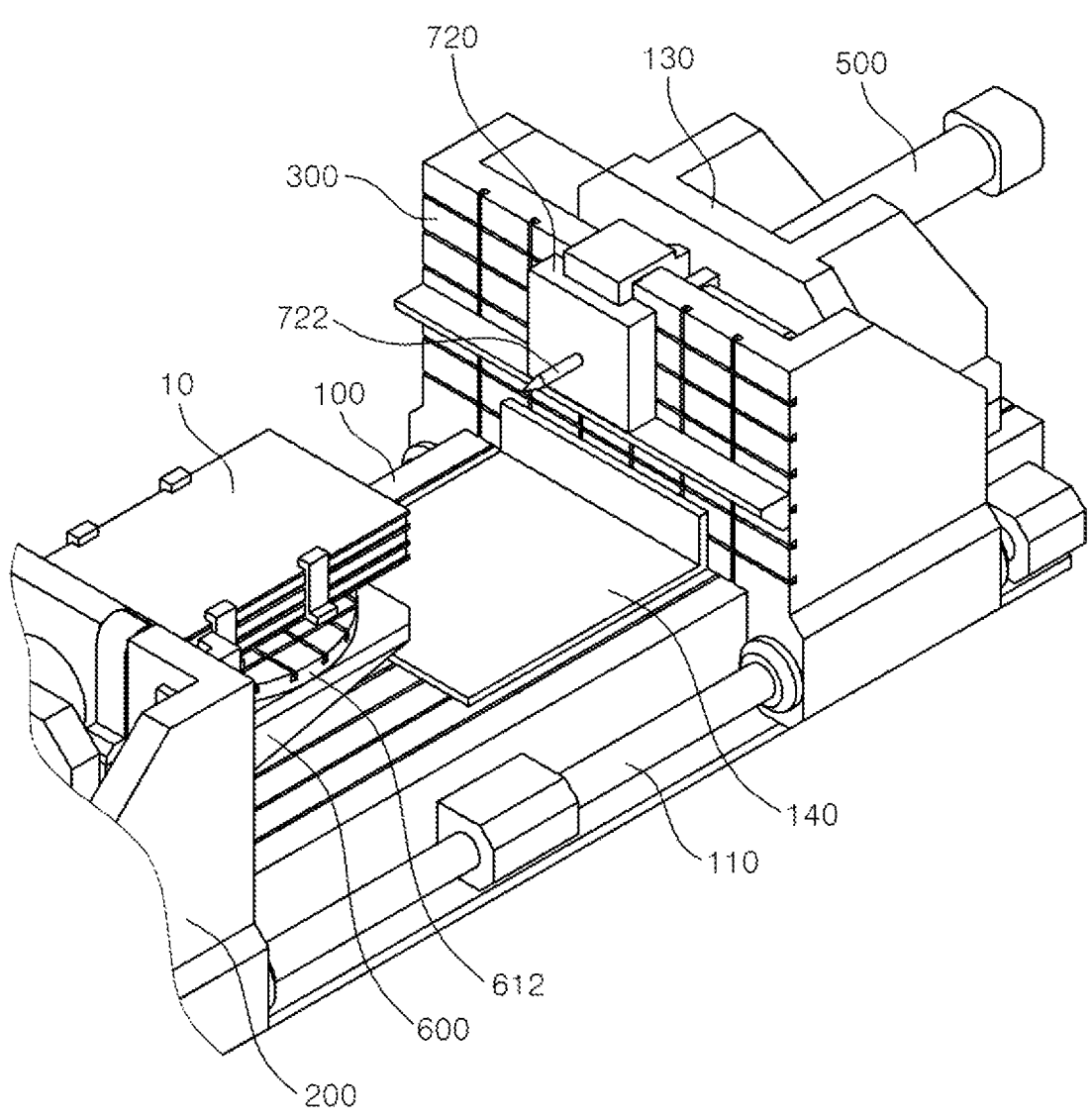
FIG. 10 is a partial perspective view of a battery test device according to another embodiment of the present invention.

FIG. 10 is a partial perspective view of a battery test device according to another embodiment of the present invention.

The battery test device according to the present embodiment may be configured to perform not only the compression test and the drop test on A battery 10 but also a penetration test conducted by passing through the inside of the battery 10.

That is, the battery test device according to the present embodiment may include a penetration jig 720 mounted on a surface of a second transfer block 300 facing a first transfer block 200 and including a through pin 722 configured to pass through the battery 10 when the first transfer block 200 and the second transfer block 300 are transferred to be close to each other. In this case, a compression jig 700 should be removed to mount the penetration jig 720 on the second transfer block 300 and thus may be detachably coupled to the second transfer block 300.

As shown in FIG. 10, after mounting the penetration jig 720 on the second transfer block 300 instead of the compression jig 700, the through pin 722 of the compression jig 700 is inserted into the battery 10 to conduct the penetration test by operating a first pressure cylinder 400 and a second pressure cylinder 500 such that the first and second transfer blocks 200 and 300 are close to each other.

Furthermore, the battery test device according to the present invention may further include a heating device (not shown) to heat the battery 10 on the lifting block 600 to perform a fire test for heating the battery 10 up to an ignition point. In this case, a heating method and a position of the heating device may be variously changed as long as the battery 10 can be heated to the ignition point by operating the heating device by a user.

As described above, when the battery test device of the present invention includes the compression jig 700 and the heating device, the compression test, the drop test, the penetration test, and the fire test can be sequentially performed at a time, thus greatly improving the usability of the battery test device.

According to a battery test device of the present invention, various types of safety evaluation tests, such as a compression test, a drop test, a penetration test, a fire test, and a collision test, can be performed, and a battery can be firmly fixed to guarantee a stable battery test.

In addition, according to the battery test device of the present invention, the spread of a fire that may occur during the test of a battery can be prevented and the overall center of gravity can be lowered to improve structural stability.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

What is claimed is:

1. A battery test device comprising:

a base block;

a pair of guide bars provided on lower ends of left and right sides of the base block, respectively;

a first transfer block and a second transfer block positioned on upper surfaces of front and rear portions of the base block, respectively, wherein the pair of guide bars are mounted to pass through left and right portions of the first and second transfer blocks, respectively, to transfer the first and second transfer blocks to be close to or away from each other in a longitudinal direction of the base block;

a first pressure cylinder and a second pressure cylinder fixedly coupled to the front and rear portions of the base block, respectively, and configured to transfer the first transfer block and the second transfer block, respectively;

a lifting block mounted on a rear surface of the first transfer block facing the second transfer block to be moved up or down, and having an upper surface on which a battery is placed;

a lifting unit mounted on the first transfer block, and configured to move the lifting block up and down; and a compression jig mounted on a front surface of the second transfer block facing the first transfer block, and configured to pressurize the battery when the first and second transfer blocks are transferred to be close to each other.

2. The battery test device of claim 1, further comprising:

a first fixing bracket coupled to the first pressure cylinder and fixed on the upper surface of the front portion of the base block; and a second fixing bracket coupled to the second pressure cylinder and fixed to the upper surface of the rear portion of the base block, wherein the first transfer block comprises a first vertical plate vertically erected between the first fixing bracket and the battery, and a pair of first side plates provided on left and right sides of the first vertical plate, and the second transfer block comprises a second vertical plate vertically erected between the second fixing bracket and the battery, and a pair of second side plates provided on left and right sides of the second vertical plate.

3. The battery test device of claim 2, further comprising:

a first fireproof chamber installed in the base block to accommodate the first fixing bracket and the first pressure cylinder, and filled with carbon dioxide, and a second fireproof chamber installed in the base block to accommodate the second fixing bracket and the second pressure cylinder, and filled with carbon dioxide.

4. The battery test device of claim 2, further comprising:

a first load cell on a portion of the first vertical plate to which pressure is applied by the first pressure cylinder, and a second load cell provided on a portion of the second vertical plate to which pressure is applied by the second pressing cylinder.

5. The battery test device of claim 4, wherein the first and second pressure cylinders are applied as hydraulic cylinders for buffering an impact force applied in a direction in which a piston is inserted to conduct a battery collision test.

6. The battery test device of claim 2, further comprising a jig transfer cylinder configured to transfer the compression jig in a width direction of the base block.

7. The battery test device of claim 2, wherein the lifting unit comprises:

a lifting cylinder including a lifting piston to be drawn in a vertical direction, and coupled to a front surface of the first vertical plate; and a lifting chain arranged to be hung on an idle roller on an upper end of the first vertical plate, and having both longitudinal ends coupled to the lifting piston and the lifting block.

8. The battery test device of claim 2, wherein the lifting block comprises a horizontal part on which the battery is placed, and a vertical part coupled to one end of the horizontal part while in contact with an outer side of the first vertical plate.

9. The battery test device of claim 8, further comprising a fixing unit which comprises:

a pair of clampers mounted on left and right sides of the first vertical plate; and a plurality of fixing cylinders configured to transfer the pair of clampers in a thickness direction of the first vertical plate so as to pressurize the vertical part against the first vertical plate or separate the vertical part from the first vertical plate.

10. The battery test device of claim 1, further comprising:

a turntable provided on a portion of the lifting block on which the battery is placed, and configured to be rotatable about a vertical central axis; and a rotating unit configured to rotate the turntable.

11. The battery test device of claim 1, further comprising:

a pair of fixing frames fixed on an upper side of the base block to be in parallel to the pair of guide bars in the longitudinal direction;

a transfer frame arranged perpendicular to the pair of fixing frames and configured to be moved in the longitudinal direction; and a hoist mounted on the transfer frame to be transferred in a longitudinal direction of the transfer frame.

12. The battery test device of claim 11, further comprising a support, for a drop test, coupled to a point on an upper surface of the base block corresponding to a position of the hoist.

13. The battery test device of claim 1, wherein the compression jig is detachably coupled to the second transfer block, and the battery test device further comprises a penetration jig mounted on a front surface of the second transfer block and including a through pin configured to pass through the battery when the first and second transfer blocks are transferred to be close to each other.

14. The battery test device of claim 1, further comprising a heating device configured to heat the battery, which is placed on the lifting block, to an ignition temperature.

\* \* \* \* \*